(12) United States Patent
Alleno

(10) Patent No.: US 11,122,822 B2
(45) Date of Patent: Sep. 21, 2021

(54) EXTRACTION AND CONCENTRATION OF FOOD FLAVOURS

(71) Applicant: CITRUS JUNOS S. A R.L., Luxembourg (LU)

(72) Inventor: Yannick Alleno, Paris (FR)

(73) Assignee: CITRUS JUNOS S. A R.L., Luxembourg (LU)

( * ) Notice: Subject to any disclaimer, the term of this patent is extended or adjusted under 35 U.S.C. 154(b) by 65 days.

(21) Appl. No.: 15/556,289

(22) PCT Filed: Mar. 7, 2016

(86) PCT No.: PCT/EP2016/054826
§ 371 (c)(1),
(2) Date: Sep. 6, 2017

(87) PCT Pub. No.: WO2016/142352
PCT Pub. Date: Sep. 15, 2016

(65) Prior Publication Data
US 2018/0035695 A1   Feb. 8, 2018

(30) Foreign Application Priority Data

Mar. 6, 2015   (LU) .......................................... 92675
Mar. 9, 2015   (LU) .......................................... 92677

(51) Int. Cl.
| A23L 27/26 | (2016.01) |
| A23L 2/56  | (2006.01) |
| A23L 27/29 | (2016.01) |
| A23L 17/20 | (2016.01) |
| A23L 27/10 | (2016.01) |
| A23L 13/30 | (2016.01) |
| A23L 27/12 | (2016.01) |

(52) U.S. Cl.
CPC ............... *A23L 2/56* (2013.01); *A23L 13/30* (2016.08); *A23L 17/20* (2016.08); *A23L 27/115* (2016.08); *A23L 27/12* (2016.08); *A23L 27/26* (2016.08); *A23L 27/29* (2016.08); *A23V 2002/00* (2013.01)

(58) Field of Classification Search
CPC . A23L 2/56; A23L 27/26; A23L 27/29; A23L 17/20; A23L 27/115; A23L 13/30; A23L 27/12
USPC .......................................................... 426/7
See application file for complete search history.

(56) References Cited

U.S. PATENT DOCUMENTS

| 4,919,963 A * | 4/1990 | Heckert ............... A23L 2/52 426/590 |
| 4,996,070 A * | 2/1991 | Nafisi-Movaghar ........ A23B 7/0205 426/330.5 |
| 5,137,739 A * | 8/1992 | Roodenrijs ............ A23F 5/30 426/384 |
| 5,653,163 A   | 8/1997 | Cogat |
| 2010/0034935 A1* | 2/2010 | Wally .................. A47J 37/00 426/232 |
| 2011/0129543 A1* | 6/2011 | Rollan ................ A61K 36/82 424/535 |
| 2013/0284031 A1* | 10/2013 | Braukmann ........ A47J 36/2483 99/343 |

FOREIGN PATENT DOCUMENTS

| CH | 511567 A | 8/1971 |
| CN | 1554290 A | 12/2004 |
| CN | 102613621 A1 | 8/2012 |
| CN | 104664296 A | 6/2015 |
| EP | 0040178 A2 | 11/1981 |
| EP | 0110638 A2 | 6/1984 |
| FR | 2911474 A1 | 7/2008 |
| GB | 617776 A | 2/1949 |
| KR | 20100126935 A | 12/2010 |
| WO | 2010066061 A1 | 6/2010 |
| WO | 2013087795 A1 | 6/2013 |

OTHER PUBLICATIONS

JP-2007116960—English Abstract (Year: 2007).*
International Search Report dated May 9, 2016 re: Application No. PCT/EP2016/054826; pp. 1-5.
J G Muller "Freeze Concentration of Food Liquids: Theory, Practice, and Economicss", Food Technology, Jan. 1967, vol. 21, No. 1, pp. 49-61 XP001349591.
Written Opinion dated May 9, 2016 re: Application No. PCT/EP2016/054826; pp. 1-7.

* cited by examiner

*Primary Examiner* — Hamid R Badr
(74) *Attorney, Agent, or Firm* — Cantor Colburn LLP

(57) ABSTRACT

A method for extracting and concentrating the flavours of one of more foodstuffs, including the steps of (a) cooking the foodstuff or foodstuffs under vacuum for a duration of 1 to 15 hours, preferably between 1.5 and 13 hours, at a temperature of between 50 and 90° C., preferably between 70 and 88° C., more preferably between 80 and 86° C., in order to obtain an exudate of the foodstuff or foodstuffs, (b) collecting the exudate, (c) crystallising the water contained in the exudate in the form of ice by freezing the exudate, and (d) obtaining a concentrated extract of flavours from the exudate by separating the ice crystals from the remainder of the exudate, where step (a) of under vacuum cooking is carried out in bags of the vacuum bag type.

16 Claims, No Drawings

EXTRACTION AND CONCENTRATION OF FOOD FLAVOURS

TECHNICAL FIELD

The present invention relates to a method for processing food products such as fruit, vegetables, meat, fish, crustaceans, shellfish or condiments in order to extract and concentrate the flavours thereof, and to the use of these concentrates and the products comprising same.

BACKGROUND

Aside from their calories, the foodstuffs used in cooking are chosen for their flavours and more importantly for the surprising combinations of flavours that can result therefrom.

The appropriate combination of different food flavours creates culinary diversity and is the basis of countless dishes and preparations for all global cuisines.

Even though all foodstuffs have specific flavours, the taste thereof can sometimes be too bland for certain preparations. In particular, the combination of different flavours almost inevitably results in the masking of certain notes or in a taste imbalance. Moreover, conventional methods such as reduction by heat too often result in altering or even spoiling some tastes and constituents.

The special field of flavour composition is, of course, that of sauces. Sauce is intended to provide cohesion in a dish by bringing together very different products in harmony. However, combining flavours from raw materials does not always produce the expected result, even for great chefs with extensive knowledge and experience.

BRIEF SUMMARY

A new method is presented for processing foodstuffs in view of extracting the flavours therefrom in order to be able to make up said flavours more freely, in a more predictable manner and above all in order to be able to produce very high quality, precise preparations and dishes that preferably have new tastes that were until now impossible to create.

DETAILED DESCRIPTION

In order to overcome at least some of the aforementioned drawbacks, the present invention proposes a method for extracting and concentrating flavours of one or more foodstuffs, comprising the steps of (a) cooking the foodstuff or foodstuffs under vacuum for a duration of 1 to 15 hours, preferably between 1.5 and 13 hours, at a temperature of between 50 and 90° C., preferably between 70 and 88° C., more preferably between 80 and 86° C., in order to obtain an exudate of the foodstuff or foodstuffs, (b) collecting the exudate thus obtained, (c) crystallising the water contained in the exudate in the form of ice by freezing the exudate, and (d) obtaining a concentrated extract from the exudate by separating the ice crystals from the remainder of the exudate, in which step (a) of under vacuum cooking is carried out in bags of the vacuum bag type.

During the research leading up to this invention, it was not only observed that the method could be used to obtain concentrated flavour extracts, but more importantly that these concentrated extracts reproduced to a very precise degree the taste of the foodstuff from which they were derived. Moreover, numerous tests have shown that this method is, in principle, universal in that it can be applied to all foodstuffs, regardless of whether they are fruit, vegetables, meat, fish, shellfish and/or condiments. Similarly, relatively dry foodstuffs can be successfully processed by adding, where necessary, a small quantity of water before under vacuum cooking.

One additional advantage of the concentrated extracts according to the present method is that the lingering taste, also known as the caudalie, of the flavours collected is much longer than that of the foodstuff from which they are derived. It is precisely the caudalie, i.e. the lingering taste or the time that the flavours remain in the consumer's mouth, that is linked to the quality of the product and therefore to the added value thereof.

Moreover, the preparation of high quality concentrated extracts according to this method also makes it possible to increase the precision, i.e. the reproducibility, of the chef's compositions.

The foodstuffs are generally washed before being processed and can be combined before being placed and cooked under vacuum in step (a). In general, the efficiency of the extraction can be improved by cutting the foodstuffs into small pieces, for example into pieces of 5 to 50 g.

Another advantage of the method is the relative simplicity thereof. The method can be carried out without the use of sophisticated equipment. Under vacuum cooking thus takes place in vacuum bags, for example conventional vacuum bags with a commercially available vacuum pump. The vacuum produced does not need to be perfect; in general, the residual pressure in the vacuum bag is 250 mbar at most (absolute pressure), preferably 100 mbar at most, advantageously 50 mbar at most, and ideally in the range of from 8 to 20 mbar. In this context, it should be noted that the under vacuum cooking step is not what is commonly called "under vacuum cooking", as the latter method is not intended for the production (or collection) of an exudate but instead for the preservation of the foodstuff in the vacuum packaging until consumption. In the present case, after cooking, the bag is opened, the exudate is collected (preferably without compressing the foodstuff) and the foodstuff that has been depleted of its substance is discarded.

Preferably, this exudate is then filtered before being frozen. The freezing step can be carried out in any appropriate manner. Preferably, however, freezing is also carried out under vacuum for hygiene reasons. In order to be able to then separate the ice crystals from the concentrated extract, the frozen exudate removed from the bag is mechanically broken up, then subjected to one or more periods of centrifugation (spinning) in order to remove the ice crystals from the flavours thus concentrated.

In a variant, freezing can take place in an appliance of the ice cream-maker type or of the granita machine type, whereby the exudate is frozen while undergoing constant, moderate shaking. Separation can then take place without mechanically breaking up the exudate. The centrifugation step can be carried out as described above.

The concentrated flavour extract is ready for use and can be stored chilled or under vacuum or by any other appropriate means. Where necessary or if desired, the method for extracting and concentrating flavours can further comprise a step (e) of freeze-drying the concentrated flavour extract.

In a particularly preferred variant, the method for extracting and concentrating flavours according to the invention is carried out such that the cooking duration under vacuum of step (a) is from 10 to 14 hours at a temperature of 80 to 86°

C. for vegetables, fruit and meat, and from 1 to 4 hours at a temperature of 80 to 86° C. for fish, shellfish and crustaceans.

In some more preferred variants, the method for extracting and concentrating flavours further comprises one or more steps of fermenting the foodstuffs and/or the concentrated extract.

In some variants, this fermentation can therefore take place before step (a). In these cases, said fermentation is preferably carried out after any cutting of the foodstuffs and particularly preferably without (intensely) washing the foodstuffs. Indeed, the fermentation step is preferably carried out using yeasts or bacteria contained in and on the foodstuff or foodstuffs ("wild" strains). It is particularly important to note that fermentation using wild strains makes it possible to produce different tastes depending on the origin of the initial foodstuff, even for an otherwise identical foodstuff. Indeed, wild strains vary greatly from one region to another and the aromas and flavours produced by the fermentation step are thus variable. This allows the regional aspect to be expressed, i.e. local flavours of the foodstuffs to be revealed.

In a variant or in addition, the concentrated extract produced in step (d) can be fermented. Since, as shown in the previous steps, the concentrated extract does not contain (enough) yeasts or bacteria, yeasts and/or bacteria must generally be added to the concentrated extract. This can be carried out either by means of commercially available strains, known as standard strains, or by means of specially grown strains, for example originating from previous fermentations or grown from the initial foodstuff or foodstuffs (the foodstuffs used in step (a)).

The fermentation step or steps are anaerobic processes and are thus performed in an oxygen-free environment, generally inside a substantially air-tight container, preferably provided with an overpressure limiting device, for example a jar having a rubber seal. The fermentation process is preferably a lactic, alcoholic, acetic, butyric, propionic or malo-lactic fermentation process, or a combination of two or more of said types of fermentation.

The fermentation step can be carried out with or without added water, salt and/or sugars. Depending on the added component and dosage thereof, the (prevailing) type of fermentation can be varied and promoted.

The fermentation of foodstuffs or concentrated extracts has several significant advantages. In general, fermentation enhances the taste of the initial product (foodstuff or concentrated extract) by creating a plurality of aromatic compounds, and thus provides a depth and wealth of aroma. Furthermore, fermentation generally results in the destruction of any pathogenic bacteria (*Listeria, Salmonella*, etc.) by different mechanisms, including the fast reproduction of the yeasts and bacteria responsible for fermentation, the production of compounds that are harmful to pathogenic agents, the increase in temperature, etc. Fermentation therefore allows the use of chemicals in food to be eliminated or reduced.

The conditions under which the fermentation or fermentations are carried out depend on the initial foodstuffs and on the expected result. In general, the fermentation should not be carried out too quickly. A temperature of between 10 and 30° C., preferably between 15 and 25° C., particularly advantageously between 19 and 23° C. is favourable for starting anaerobic fermentation within the context of the present invention. Often, after a few days, it is preferable to reduce the temperature by a few degrees in order to allow fermentation to continue for a period of a few days to a few weeks (or more in some cases). The taste will evolve throughout this period. Therefore, the user can regularly taste the extract in order to determine the optimum point in time for the intended use.

Fermentation is generally associated with the production of carbon dioxide. In a particularly advantageous variant, fermentation is carried out on the concentrated extract and the fermented extract is used, potentially after filtration, in preparations, notably sparkling beverages and in particular "beer"-type beverages.

In an additional aspect, the invention provides for the use of one or more concentrated flavour extracts obtained by a method as described herein for preparing dishes, for preparing soups, for preparing purées, for preparing sauces, for preparing condiments or for flavouring beverages, desserts, confectionery and ice creams. The beverages can be alcoholic or non-alcoholic beverages such as wine, champagne, beer, sparkling or still water, infusions, cocktails, etc. In particularly advantageous variants, the invention relates to the use of one or more concentrated flavour extracts obtained by a method as described herein for preparing a wide variety of non-alcoholic beverages, the absolute complexity of which is similar to that of wine (as opposed to known fizzy drinks).

A further aspect of the invention relates to dishes, soups, purées, sauces, condiments, beverages, desserts, confectionery and ice creams comprising one or more concentrated flavour extracts obtained by a method as described herein. In a particularly preferred variant, a plurality of concentrated extracts can be mixed together in order to create combinations such as those that could be created by a winemaker, for example blends or mixtures.

Healthy, flavoursome dishes can be prepared by virtue of the simple method described herein and by virtue of the concentrated flavour extracts thus obtained. Of course, this is advantageous for all preparations, but is even more beneficial in the preparation of sauces, soups and purées. In general, by allowing the authentic flavour of the foodstuffs to be extracted and concentrated, this invention opens up new applications, in particular in the health, nutrition and dietary sectors for elderly people, by providing healthy, sapid preparations without the use of flavour enhancers or similar products. One specific advantage of the present invention is that it can also be used to provide a texture to the taste, i.e. the mouthfeel, in particular sandy textures, flaky textures, etc.

Other details and features of the invention will become apparent from the following detailed description, given by way of example, of several advantageous embodiments.

EXAMPLES

The present invention will be illustrated by several examples of the present method applied to different foodstuffs.

Extraction and Concentration of Celeriac (Variant 1)

Ingredients:
1 kg celeriac in its skin, cut into large cubes
600 g water
Extraction:
Wash the celeriac.
Dice the celeriac.
Place it in a vacuum bag with the water, then seal the bag.
Cook at 83° C. for 12 h (in steam).
Once cooked, strain the liquid through Tork paper.

Once it has all been strained, place this liquid into a cooling cell.

Concentration:

Once this liquid has cooled, place it under vacuum and freeze it in the cooling cell.

Once frozen, reduce the frozen block into granita by hitting it with a rolling pin then spinning it in the centrifuge.

In a variant, the cold liquid can be introduced into a granita machine. When the water has frozen in the form of crystals, the granita is placed in the spinner or centrifuge. In yet another variant, the liquid can be introduced into an endless screw cryoconcentrator or similar machine before being placed in the centrifuge.

Store in the refrigerator.

The lingering taste or caudalie of this celeriac concentrated flavour extract is in the range 1 to 1.5 minutes, compared with about 10 to 20 seconds for normal celeriac.

Extraction and Concentration of Celeriac (Variant 2)

Ingredients:
1 kg celeriac in its skin, washed and cut into even-sized pieces of 30 g, 600 g water Extraction:
Place the above ingredients into a vacuum bag, then seal the bag.
Cook at 83° C. for 12 h and leave to rest for 2 h.
Filter the liquid through a superbag.

Concentration:
Place this liquid in an ice cream maker and leave to crystallise.
Spin in the centrifuge (3 times).
Store in a chilled environment.

Extraction and Concentration of Sole

Ingredients:
500 g sole fillet, 20 g celery, 2.5 g salt

Extraction:
Place the above ingredients into a vacuum bag, then seal the bag.
Cook at 85° C. for 1 h.
Stir, blend and filter the exudate obtained.

Concentration:
Place this liquid in an ice cream maker and leave to crystallise.
Spin in the centrifuge.
Store in the refrigerator.

Extraction and Concentration of Chicken

Ingredients:
1 kg chicken in its skin, 30 g carrots, 20 g celery, 260 g calf's foot jelly, 600 g water Extraction:
Cut and place the above ingredients into a vacuum bag, then seal the bag.
Cook at 83° C. for 12 h.
Stir, blend and filter the exudate obtained.
Place the exudate under vacuum and freeze it in the cooling cell.
Reduce the frozen block into granita then spin in the centrifuge.
Store in the refrigerator.

Extraction and Concentration of Fermented Celeriac

Ingredients:
2 kg celeriac
1 l unchlorinated water
30 g additive-free coarse salt (non-iodised, non-fluoridated, E536-free)

Fermentation
Create the brine: if the tap water is chlorinated, simply boil it then cool it to evaporate the chlorine. Otherwise, spring water is perfectly suitable, but mineral water is not.
Dissolve the salt in the water. It is always used cold.
Select recently harvested, healthy celeriacs that are not too big, so as to ensure that they are not hollow. Peel but do not rinse unless covered in soil.
Cut the celeriacs into slices or grate using a coarse grater. Compress into jars comprising a rubber seal.
Pour the cold brine until the vegetables are immersed. It is important that a 2 cm space is left between the level of the liquid and the edge of the container, as fermentation will increase the volume. Hermetically seal the jars.
Store the jars between 19° C. and 23° C. for 7 days in order to start fermentation, then keep between 15 and 17° C. for at least 2 more weeks. The jars can be stored for several years, even at ambient temperature.
(The same technique is applied for carrots, turnips, radishes, beetroot, kohlrabi, parsnips, etc.)

Extraction:
Place the celeriac together with the juices into a vacuum bag, then seal the bag.
Cook at 83° C. for 12 h (in steam).
Once cooked, strain the liquid through Tork paper.
Once it has all been strained, place this liquid into a cooling cell.

Concentration:
Once this liquid has cooled, place it under vacuum and freeze it in the cooling cell.
Once frozen, reduce the frozen block into granita by hitting it with a rolling pin then spinning it in the centrifuge.
Store in the refrigerator.

Fermentation of Concentrated Quince Extract

Quince lemonade with kefir grains
Mix 500 ml quince extract with 1 tablespoon of kefir grains and leave at ambient temperature until it fizzes, i.e. about 60 hours.
Filter the grains in order to recover them, and place the preparation in a bottle comprising a mechanical closing mechanism, without filling to the top.
Wait another 48 hours, then refrigerate. Open with care.

The invention claimed is:
1. A method for extracting and concentrating flavors of one or more foodstuffs, comprising the steps of
   (a) cooking the foodstuff or foodstuffs under vacuum for a duration of 1 to 15 hours at a temperature of between 50 and 90° C. in order to obtain an exudate of the foodstuff or foodstuffs,
   (b) collecting the exudate,
   (c) crystallising the water contained in the exudate in the form of ice by freezing the exudate, and
   (d) obtaining a concentrated extract of flavors from the exudate by separating the ice crystals from the remainder of the exudate, wherein step (a) of under vacuum cooking is carried out in a vacuum bag, wherein step (c) is also carried out under vacuum in a vacuum bag, wherein collecting the exudate does not comprise compressing the foodstuff or foodstuffs.

2. The method for extracting and concentrating flavors according to claim 1, further comprising a step of fermenting the foodstuffs before step (a) and/or the concentrated extract after step (d).

3. The method for extracting and concentrating flavors according to claim 2, comprising a fermentation step before step (a), the fermentation being carried out using yeasts or bacteria contained in and on the foodstuff or foodstuffs.

4. The method for extracting and concentrating flavors according to claim 2, comprising a fermentation step after step (d), the fermentation being carried out using yeasts and/or bacteria added to the concentrated extract.

5. The method for extracting and concentrating flavors according to claim 1, wherein the foodstuff or foodstuffs are washed and/or cut into pieces before step (a).

6. The method for extracting and concentrating flavors according to claim 1, wherein step (b) further comprises filtering the collected exudate.

7. The method for extracting and concentrating flavors according to claim 1, wherein the separation of the ice crystals is carried out by one or more periods of centrifugation.

8. The method for extracting and concentrating flavors according to claim 1, further comprising a step (e) of freeze-drying the concentrated flavor extract.

9. The method for extracting and concentrating flavors according to claim 1, wherein the cooking duration under vacuum of step (a) is from 10 to 14 hours at a temperature of 80 to 86° C. for vegetables, fruit and meat, and from 1 to 4 hours at a temperature of 80 to 86° C. for fish, shellfish and crustaceans.

10. A method for preparing a dish, for preparing a soup, for preparing a purée, for preparing a sauce, for preparing a condiment, or for flavoring a beverage, a dessert, a confectionery, or an ice cream, the method comprising extracting and concentrating flavors of one or more foodstuffs according to the method of claim 1, and preparing a dish, preparing a soup, preparing a purée, preparing a sauce, preparing a condiment, or flavoring a beverage, a dessert, a confectionery, or an ice cream with the concentrated extract of flavors.

11. The method according to claim 10, wherein the beverage is wine, champagne, beer, sparkling or still water, an infusion, or a cocktail.

12. A method for preparing a blend or a mixture, the method comprising extracting and concentrating flavors of one or more foodstuffs according to the method of claim 1 a plurality of times to obtain a plurality of concentrated extracts of flavors, preparing a blend or a mixture with the plurality of concentrated extracts of flavors.

13. A dish, soup, purée, sauce, condiment, beverage or dessert comprising one or more concentrated flavor extracts obtained by a method according to claim 1.

14. A blend or mixture comprising a plurality of concentrated flavor extracts obtained by a method according to claim 1.

15. A method for extracting and concentrating flavors of one or more foodstuffs, comprising the steps of (a) cooking the foodstuff or foodstuffs under vacuum for a duration of 1 to 15 hours at a temperature of between 50 and 90° C. in order to obtain an exudate of the foodstuff or foodstuffs, (b) collecting the exudate, (c) crystallising the water contained in the exudate in the form of ice by freezing the exudate, and (d) obtaining a concentrated extract of flavors from the exudate by separating the ice crystals from the remainder of the exudate, wherein step (a) of under vacuum cooking is carried out in a vacuum bag and a residual pressure in the vacuum bag is in the range of from 8 to 20 mbar, wherein collecting the exudate does not comprise compressing the foodstuff or foodstuffs.

16. A method for extracting and concentrating flavors of one or more foodstuffs, comprising the steps of (a) cooking the foodstuff or foodstuffs in steam and under vacuum for a duration of 1 to 15 hours at a temperature of between 50 and 90° C. in order to obtain an exudate of the foodstuff or foodstuffs, (b) collecting the exudate, (c) crystallising the water contained in the exudate in the form of ice by freezing the exudate, and (d) obtaining a concentrated extract of flavors from the exudate by separating the ice crystals from the remainder of the exudate, wherein step (a) of under vacuum cooking is carried out in a vacuum bag.

* * * * *